United States Patent
Capelle et al.

(10) Patent No.: US 7,567,506 B2
(45) Date of Patent: Jul. 28, 2009

(54) METHOD OF MANAGING MALFUNCTIONS AT ROUTER LEVEL, AND A ROUTER

(75) Inventors: Marc Capelle, Chilly Mazarin (FR); Francois Billaut, Paris (FR); Bruno Decraene, Vanves (FR)

(73) Assignee: France Telecom, Paris (FR)

( * ) Notice: Subject to any disclaimer, the term of this patent is extended or adjusted under 35 U.S.C. 154(b) by 601 days.

(21) Appl. No.: 11/141,032

(22) Filed: Jun. 1, 2005

(65) Prior Publication Data

US 2005/0270971 A1    Dec. 8, 2005

(30) Foreign Application Priority Data

Jun. 1, 2004    (EP)    .................... 04291364

(51) Int. Cl.
*H04L 12/26* (2006.01)
(52) U.S. Cl. ...................... 370/216; 370/245
(58) Field of Classification Search .................. 370/216, 370/229, 237, 241, 351, 245; 714/709, 711
See application file for complete search history.

(56) References Cited

U.S. PATENT DOCUMENTS

| | | | |
|---|---|---|---|
| 6,327,669 B1 | 12/2001 | Croslin | |
| 6,857,026 B1 * | 2/2005 | Cain | ........................... 709/239 |
| 7,123,620 B1 * | 10/2006 | Ma | ........................ 370/395.32 |
| 2003/0235195 A1 * | 12/2003 | Shenoy et al. | ................ 370/389 |
| 2004/0196783 A1 * | 10/2004 | Shinomiya | .................. 370/216 |

OTHER PUBLICATIONS

Cisco Systems: "Catalyst 8500 CSR Architecture" White Paper, juillet 1998 (Jul. 1998), XP002151999, p. 8, colonne de droite, ligne 42-p. 10, colonne de droite, ligne 15; figure 6, p. 11, colonne de gauche, ligne 28-p. 11, colonne de gauche, ligne 42.

* cited by examiner

*Primary Examiner*—Derrick W Ferris
*Assistant Examiner*—Jason Levelle
(74) *Attorney, Agent, or Firm*—Young & Thompson

(57) ABSTRACT

This method of managing malfunctions in a telecommunications network is implemented in a router having a plurality of communication interfaces and a nominal operational routing plan that is duplicated on its interfaces. The method comprises the following steps that are performed during nominal operation:

a step of calculating a secondary operational routing plan for degraded modes of operation; and a step of transferring secondary plans to each of the interfaces;

and in the event of a malfunction being detected, a step of causing all of the interfaces to switch from the nominal plan to a secondary plan that corresponds to the degraded mode of operation that results from the detected malfunction.

10 Claims, 2 Drawing Sheets

METHOD OF MANAGING MALFUNCTIONS AT ROUTER LEVEL, AND A ROUTER

The present invention relates to a method of managing malfunctions in a telecommunications network at the level of routing equipment, and also to such routing equipment.

BACKGROUND OF THE INVENTION

In telecommunications networks, routes are defined for conveying data packets between different items of routing equipment, referred to herein for simplicity as "routers".

All routers have a plurality of communication interfaces with the network. Each router uses a communications protocol, and some are arranged to generate a plurality of different communication protocols for conveying data packets.

In conventional manner, a given router thus has a unitary database of routing information for each routing protocol and referred to as its "routing information base" (RIB). For example, a given router can have therein a routing information base for routing protocols for use between domains and known as exterior gateway protocols (RIB-EGP), and another routing information base for routing protocols for use within a domain and known as "interior gateway protocols" (RIB-IGP).

These unit databases are combined by the router to form an operational routing plan referred to as a "forwarding information base" (FIB) corresponding to all of the unitary databases taken together and including special management of route superpositions, so as to obtain a data structure giving all routing solutions for a given router.

This operational routing plan is then transmitted to all of the interfaces of the router to enable them to route packets in independent and coherent manner.

In such a telecommunications network, when a malfunction occurs, e.g. the result of a given router being unavailable, all or some of the other routers in the network need to modify their operational routing plans in order to adapt to the degraded mode of operation of the network.

In existing methods for managing malfunctions, fault detection is followed by a period of propagating information devoted to warning all of the routers whose operation will be disturbed by the fault.

Each router then recalculates new routing paths and updates the unitary database relating to the associated protocol. This update is followed by recalculating the operational routing plan, which then needs to be transferred to each of the interfaces.

These operations are lengthy and complex, and they are made worse by having large numbers of interfaces and routes.

In particular, the time required for calculating the updates for each unitary database and then for calculating the operational routing plan, followed by the time required for transferring the plan to all of the interfaces, leads to the router being unavailable in a manner that is particularly detrimental for the network as a whole.

OBJECT AND SUMMARY OF THE INVENTION

The object of the invention is to solve this problem by defining a method of managing network malfunctions that enables operation to be reestablished quickly after a malfunction has been detected.

To this end, the present invention provides a method of managing malfunctions in a telecommunications network, in a router that has a plurality of communication interfaces with said network, and a nominal operational routing plan duplicated on the interfaces, wherein the method comprises, during nominal operation:

a step of calculating at least one secondary operational routing plan for degraded modes of operation of the network; and a step of transferring secondary plans to the interfaces;

these steps being performed prior to detecting a malfunction that creates conditions for a degraded mode of operation.

The prior calculation of a plurality of secondary operational routing plans and their transfer to each of the interfaces during nominal operation makes it possible to switch the interfaces quickly when a malfunction is detected.

Other characteristics of the method of the invention are defined in the dependent claims.

The invention also provides a router of the type comprising a plurality of communication interfaces with a telecommunications network, and further comprising:

a unitary database of routing information for the interfaces;

calculation means for calculating a nominal operational routing plan from said unitary database; and means for transferring information to memories associated with the interfaces;

wherein said calculation means, in co-operation with means for simulating malfunctions, are adapted to calculate secondary operational routing plans for degraded modes of operation of the network, and said transfer means are adapted to transfer the secondary plans to the memories associated with the interfaces before a malfunction is detected that creates the conditions for a degraded mode of operation.

BRIEF DESCRIPTION OF THE DRAWINGS

The invention will be better understood on reading the following description given purely by way of non-limiting example and with reference to the accompanying drawings, in which.

MORE DETAILED DESCRIPTION

Figure 1:
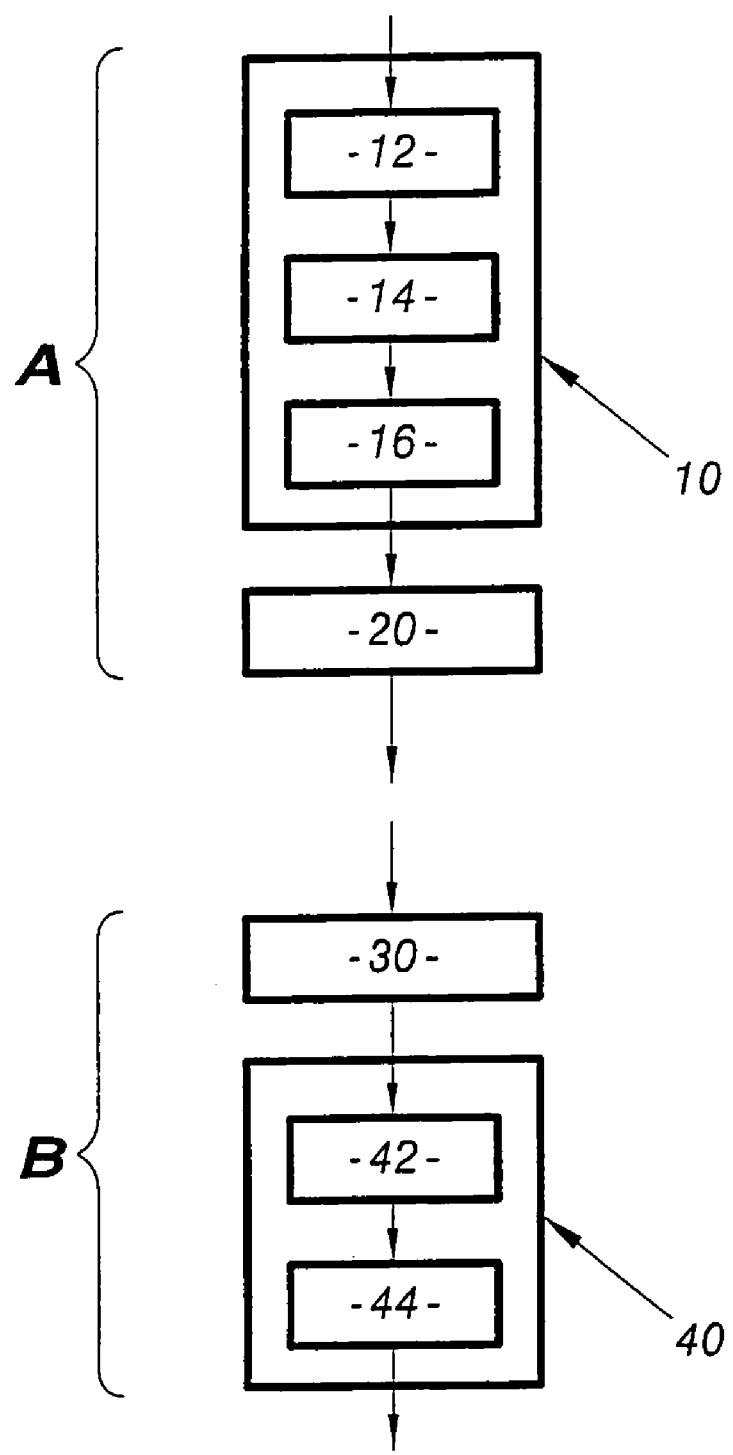
FIG. 1 is a flow chart of the method of the invention.

FIG. 1 is a flow chart for the method of the invention for managing malfunctions in a telecommunications network.

The method is implemented in a given router, said router having a plurality of communication interfaces for communicating with the network, and a nominal operational routing plan known as a "forwarding information base" (FIB) that is duplicated on the communication interfaces.

In the embodiment described, the router has a plurality of communication interfaces, and it is adapted to manage a plurality of network protocols. It has a unitary routing information routing database associated with each of those protocols, and referred to as a "routing information base" (RIB).

As mentioned above, a unitary database is defined for each routing protocol, for example. In particular there exists a unitary database for each protocol for use between domains and referred to as an "exterior gateway protocol" (RIB-EGP), where one such example is the protocol known as "BGP4". Similarly, there exists a unitary database for each routing protocol for use within a domain and known as an "interior gateway protocol" (RIB-IGP), where examples of such protocols are known as "ISIS" and "OSPF", and there also exists a unitary database for each other protocol family conveyed over the network, for example the protocol known as "MULTICAST".

The method of the invention comprises a first stage referenced A that is performed during a period of nominal operation of the router.

This first stage A begins with a step 10 of calculating a plurality of secondary operational routing plans for degraded modes of operation of the network.

In the example, this step 10 includes a substep 12 of simulating a malfunction for a router under consideration. By way of example, this substep 12 is performed by using a simulator that is distinct from the routing equipment, and by manually selecting malfunctions that might occur in the topology of the network.

Substep 12 is followed by a substep 14 of calculating the shortest paths for conveying information in the degraded mode of operation that results from the malfunction simulated in substep 12.

Substep 14 is performed for each of the interfaces of the router using conventional algorithms, and the set of results obtained during these substeps 14 are combined in a substep 16 serving to define a secondary operational routing plan for the degraded mode of operation that results from the simulated malfunction.

Substeps 12, 14, and 16 are repeated so as to obtain secondary operational routing plans for all possible malfunctions, or at least for the main malfunctions that are likely to occur, or indeed the malfunctions that are the most critical.

At the end of step 10, one or more secondary operational routing plans are available for degraded modes of operation of the network.

Naturally, a plurality of degraded modes of operation can be associated with the same secondary operational routing plan.

The method then comprises a step 20 of transferring the secondary operational routing plans to the interfaces of the router.

This step 20 is also implemented during stage A, i.e. while the router is in a period of nominal operation, so that the time required for transferring all of the secondary plans does not have any influence on the operational behavior of the router.

At the end of step 20, the interfaces of the router thus have available not only the nominal operational routing plan, but also a plurality of secondary operational routing plans for degraded modes of operation of the network.

The method of the invention then has a stage B that is implemented in the event of a malfunction in the network being detected, with stage B, by its very nature, possibly occurring at any random time relative to stage A.

Stage B begins with a step 30 of the router detecting a malfunction. For example, this detection step 30 corresponds in conventional manner to the loss of a physical signal, to the absence of data packets or frames being received that correspond to a protocol declaration as is sent regularly by a router to its neighbors in order to inform them about its own state of operation.

Detection step 30 is followed by a step 40 of switching router interfaces from the nominal operational routing plan to a secondary operational routing plan corresponding to the degraded mode of operation that results from the detection malfunction.

This step 40 comprises firstly a substep 42 of selecting one particular secondary plan from the plurality of secondary plans precalculated during stage A, followed by a substep 44 of sending synchronization information to the communication interfaces so as to cause these interfaces to switch simultaneously and instantaneously to the selected secondary plan.

This substep 44 can be implemented in particular by sending two successive messages, the first message telling each interface which secondary plan has been selected, and being followed by a synchronization second message for causing the selected secondary plan to be applied.

The method of the invention thus makes it possible to reduce considerably the length of time that elapses between step 30 in which a malfunction is detected and the end of step 40, at which point the router is operational, in a degraded mode of operation of the network.

By means of the method of the invention, both the calculation of the secondary operational routing plan and its transfer to the interfaces are anticipated, i.e. they are performed early, during a period of nominal operation.

Thus, between the instant at which a malfunction is detected and the time when the router again becomes available, there is no need to perform any calculation, and only short synchronizing information needs to be transferred.

Naturally, the method of the invention can cohabit with an existing method, for example so as to enable a conventional method to be implemented in the event of a malfunction being detected that does not correspond to any of the degraded modes of operation that have been anticipated and precalculated during stage A, such that no secondary operational routing plan is available at the time the malfunction is detected.

Advantageously, stage A of the method of the invention is performed periodically so as to update the secondary operational routing plans as a function of changes in the topology of the network. In particular, in the event of a malfunction becoming permanent, the degraded mode of operation becomes the nominal mode of operation and the secondary operational routing plan becomes the nominal operational plan, with other secondary operational routing plans being calculated and stored in the interfaces.

The method of the invention is particularly advantageous for implementation by routers situated at the periphery of a network and thus having a small number of interfaces towards the core of the network and possibly only two interfaces corresponding to normal operation and to emergency operation. In such a configuration, calculating a nominal operational routing plan and a single secondary operational routing plan can cover all potential malfunctions.

Figure 2:
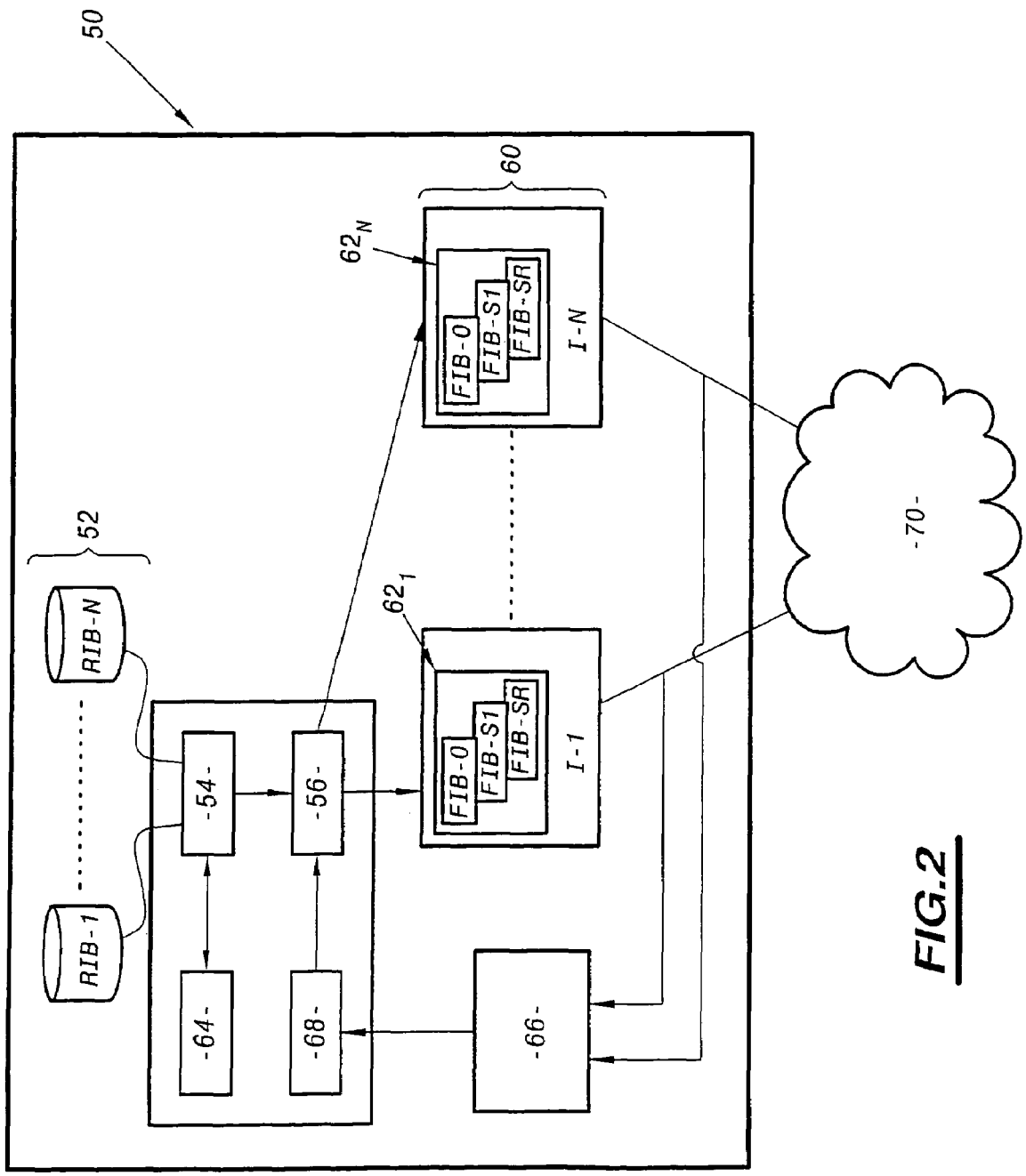
FIG. 2 is a block diagram of a router implementing the method of FIG. 1.

With reference to FIG. 2, there follows a description of a block diagram of a router implementing the method of the invention.

In conventional manner, the router 50 comprises a plurality of unitary databases RIB-1 to RIB-N, with these databases together being given an overall numerical reference 52.

The router further comprises a unit 54 for calculating operational routing plans, which unit is connected to the database 52 and adapted to deliver the nominal operational routing plan referenced FIB-O. The router then has means 56 for transferring information to a plurality of network interfaces I-1 to I-N. These interfaces together are given overall numerical reference 60.

Each network interfaces has its own memory unit $62_1$ to $62_N$ serving in particular for storing the nominal operational routing plan FIB-O.

In the invention, the router 50 includes means 64 for simulating malfunctions, connected to the calculation unit 54 and through it to the database 52.

In addition, the router 50 has means 66 for detecting malfunctions, connected to means 68 for synchronizing the interfaces 60, and adapted to control the means 56 to transfer information to the interfaces 60.

The means 66 for detecting malfunctions and the interfaces 60 are connected to the telecommunications network given numerical reference 70.

In nominal operation, the databases 52 enable the calculation unit 54 to calculate the nominal operational routing plan FIB-O, which is transferred to the interfaces 60 by the transfer means 56. Each interface 60 stores the nominal plan in its own memory 62 in order to implement it.

In the method of the invention, during a period of nominal operation, the simulation means 64 modify the parameters delivered by the databases 52 so as to enable secondary operational routing plans to be calculated by the calculation unit 54 for degraded modes of operation. In other words, the calculation means 54 are arranged to co-operate with the simulation means 64 to calculate the secondary operational routing plans.

The simulation means 64 and the calculation unit 54 thus implement step 10 of the method of the invention.

The secondary operational routing plans referenced FIB-S1 to FIB-S4 are then transferred by the transfer means 56 to the memories $62_1$ to $62_N$ of the interfaces I-1 to I-N, thereby implementing step 20 of the method.

Each interface 60 thus stores the nominal operational routing plan FIB-O, together with all of the secondary operational routing plans FIB-S1 to FIB-SR.

It should be observed at this point that steps 10 and 20 respectively of calculating and transferring secondary operational routing plans to the interfaces, where said plans correspond to degraded modes of operation of the network, are performed prior to detecting a malfunction leading to conditions in which operation needs to take place in a degraded mode.

Subsequently, the means 66 detect the appearance of a malfunction on the network 70 by implementing step 30 of the method.

The nature of the malfunction is sent to the synchronization means 68, which select one of the secondary routing plans from amongst the previously calculated plurality of plans and send a switching instruction to the interfaces 60 via the means 56.

This instruction is received simultaneously by the interfaces 60 which switch from the nominal operational routing plan FIB-O to a determined secondary plan that has previously been stored.

This switchover corresponds to implementing step 40 and takes place extremely quickly.

In a variant, the simulation means 64 are external to the router 50 and are connected thereto via conventional connections, e.g. via USB type connections, or they are distinct internal processes.

Similarly, in another variant, the means 66 for detecting malfunctions are external to the router 50, which has means for connection to such means for detecting malfunctions.

In the embodiment described, the calculation means formed by the simulation means 64 of the calculation unit 54, the transfer means 56, and the switch means 68 are all integrated in a single microprocessor. Naturally, other hardware solutions such as the use of programmed components, a plurality of microprocessors, or various other equivalent solutions could be envisaged within the ambit of the invention.

It will also be understood that the method of managing a malfunction as described and including in particular the step 10 of calculating a secondary routing plan and the step 20 of transferring such a plan to the interfaces is performed by the router 50 which is a computer device, under the control of software instructions in a computer program. Consequently, the invention also provides a computer program for a router, the program comprising software instructions for causing the router to execute the above-described method. The program may be stored in or transferred by a data medium. The data medium may be a hardware storage medium, e.g. a CD-ROM, a magnetic floppy disk, or a hard disk, or even a transmission medium such as an electrical, optical, or radio signal. The invention thus also provides such a data medium.

What is claimed is:

1. A method of managing malfunctions in a telecommunications network, in a router that has a plurality of communication interfaces with said network, and a nominal operational routing plan duplicated on the interfaces, wherein the method comprises, during nominal operation:
    a step of calculating at least one secondary operational routing plan for degraded modes of operation of the network; and
    a step of transferring secondary plans to the interfaces;
    these steps being performed prior to detecting a malfunction that creates conditions for a degraded mode of operation,
    wherein, on detecting a malfunction in the network, a step is provided for switching the interfaces from the nominal plan to a secondary plan corresponding to the degraded mode of operation that results from the detected malfunction,
    wherein said step of switching the interfaces comprises:
    a substep of selecting a secondary operational routing plan corresponding to a degraded mode of operation that results from a detected malfunction; and
    a substep of transmitting synchronization information to cause said interfaces to switch simultaneously to said selected secondary plan,
    wherein said substep of transmitting synchronization information comprises transmitting information identifying said selected secondary operational routing plan, and a switchover command.

2. The method according to claim 1, wherein each of said interfaces is adapted to manage one or more network communications protocols.

3. The method according to claim 1, wherein said calculation step comprises:
    a substep of simulating a malfunction;
    a substep of updating unitary routing databases associated with said interfaces to take account of said simulated malfunction; and
    a substep of calculating a secondary operational routing plan for the degraded mode of operation that results from the simulated malfunction.

4. A method according to claim 1, wherein said calculation and transfer steps are performed periodically.

5. The method according to claim 1, wherein said routing equipment has two communication interfaces with said network, and wherein said calculation step comprises calculating a single secondary operational routing plan.

6. A computer readable recording medium, tangibly embodying a computer program for a router including software instructions for causing said router to execute the method according to claim 1.

7. The method according to claim 1, wherein the secondary plan is one of a plurality of secondary plans, the secondary plan corresponding to a degraded mode of operation that results from the detected malfunction when a particular neighboring router fails.

8. A router of the type comprising a plurality of communication interfaces with a telecommunications network, and further comprising:
    a unitary database of routing information for the interfaces;
    calculation means for calculating a nominal operational routing plan from said unitary database; and means for transferring information to memories associated with the interfaces;

wherein said calculation means, in cooperation with means for simulating malfunctions, are adapted to calculate secondary operational routing plans for degraded modes of operation of the network, and said transfer means are adapted to transfer secondary plans to the memories associated with the interfaces before a malfunction is detected that creates the conditions for a degraded mode of operation, further comprises synchronization means for synchronizing the interfaces to cause them to switchover from the nominal plan to a secondary plan when a malfunction is detected, the secondary plan corresponding to the degraded mode operation resulting from the detected malfunction; and the synchronization means is operable to transmit synchronization information to cause said interfaces to switch simultaneously to a selected secondary plan; and to transmit information identifying said selected secondary operational routing plan and a switchover command.

9. The router according to claim 8, including said simulation means.

10. The router according to claim 8, including malfunction detection means connected to said network and to said synchronization means.

* * * * *